US006877015B1

(12) United States Patent
Kilgore et al.

(10) Patent No.: US 6,877,015 B1
(45) Date of Patent: *Apr. 5, 2005

(54) SYSTEM AND METHOD FOR DYNAMICALLY ADJUSTING DATA VALUES IN RESPONSE TO REMOTE USER INPUT

(75) Inventors: Benjamin F. Kilgore, Redmond, WA (US); Steven D. Lamb, Woodinville, WA (US); Loren K. Imes, Bothel, WA (US); Mark E. Hickling, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/148,615

(22) Filed: Sep. 4, 1998

(51) Int. Cl.[7] .............................. G06F 7/00; G06F 3/00
(52) U.S. Cl. ................................... 707/104.1; 715/744
(58) Field of Search .......................... 715/744; 705/1–3, 705/36, 27; 709/200, 203; 703/6; 341/20–27; 345/145, 163, 167; 434/307 R (56) References Cited

U.S. PATENT DOCUMENTS

| | | | | |
|---|---|---|---|---|
| 5,808,916 A | * | 9/1998 | Orr et al. ........................ 703/6 |
| 5,841,437 A | * | 11/1998 | Fishkin et al. ............... 345/619 |
| 5,999,169 A | * | 12/1999 | Lee ............................. 345/163 |
| 6,012,044 A | * | 1/2000 | Maggioncalda et al. ....... 705/36 |
| 6,021,426 A | * | 2/2000 | Douglis et al. ............. 709/200 |
| 6,061,004 A | * | 5/2000 | Rosenberg ................... 341/20 |
| 6,208,974 B1 | * | 3/2001 | Campbell et al. .............. 705/3 |

* cited by examiner

*Primary Examiner*—Safet Metjahic
*Assistant Examiner*—Te Yu Chen
(74) *Attorney, Agent, or Firm*—Lyon & Harr, L.L.P.; Craig S. Fischer (57) ABSTRACT

The present invention is embodied in a system and method for dynamically adjusting data values in response to remote user input to provide the remote user with real time interaction of the data values. First, a user requests information from a remote computer and then results of the requested information are collected at a host computer. Second, the results of the request are transmitted in a hidden format from the host to the remote computer. Third, the results are remotely processed in response to user input. Last, the processed results are dynamically displayed. Client-side processing is preferably used instead of server-side processing to enable the user to quickly access and adjust information dynamically and in real time without server delays.

19 Claims, 7 Drawing Sheets

SYSTEM AND METHOD FOR DYNAMICALLY ADJUSTING DATA VALUES IN RESPONSE TO REMOTE USER INPUT

BACKGROUND OF THE INVENTION

1. Field of the Invention

The present invention relates to a system and method for processing data, and in particular, to a system and method for adjusting data values in real time in response to remote user input.

2. Related Art

Quick and easy interaction between a server and a client user is desirable, especially for systems with bandwidth limitations. For example, the Internet utilizes a server-client system. Many client users with Internet access have bandwidth limitations. For example, during interaction with the World Wide Web, these client users typically encounter server processing every time the user makes a request. Constant server processing bogs down the server, delays user Internet navigation and creates an unpleasantly slow Internet experience for the user.

For example, many servers have systems that provide access to database information. One such system is a used car online classified database. After the user makes an initial request, the server provides results related to the request. However, if the user desires to modify, adjust, limit, etc. the results, the server typically must be re-accessed and a new request is submitted as a database query. As a result, the user is required to navigate sometimes through several layers of information. Thus, these systems are slow, do not allow real time user interaction and require undue processing. Therefore, what is needed is an effective and efficient technique for adjusting data values in real time in response to remote user input. What is also needed is a system and method that utilizes client-side processing instead of server-side processing for data processing to avoid lengthy server reloading.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for dynamically adjusting data values in response to remote user input. Namely, the system and method provides the remote user with real time interaction of data values, such as a set of results, produced by a host system. As such, the user can dynamically adjust the set of results from a remote location. The system and method of the present invention preferably utilizes client-side processing to achieve real time interaction.

Specifically, first, a user requests information from a remote computer and then results of the requested information are collected at a host computer. Second, the results of the request are transmitted from the host to the remote computer in a format that is preferably encoded and transparent to the remote user. Third, the results are remotely processed in response to user interaction with the results. The processed results are dynamically adjusted and displayed as the user interacts with the results. Graphical user interface control devices are used to allow user interaction and adjustment of the results. For example, slider filter controls, alphanumerical boxes, drop-down menus, or the like can be used. The system and method of the present invention preferably utilizes client side-processing of the results instead of server-side processing. This enables the user to quickly access and adjust information dynamically and in real time without server delays.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

Quick and easy interactive computer environments are very desirable, especially for remote users. The present invention provides this type of interactive computer environment for remote users by allowing the remote user to interact with data values for dynamically adjusting the data values. Namely, the system and method of the present invention allows the remote user to adjust a set of results produced by a host system in real time. Preferably, the system and method of the present invention achieves real time interaction by utilizing client-side processing for providing dynamic interaction of the set of results by a user from a remote location.

Exemplary Operating Environment

Figure 1:
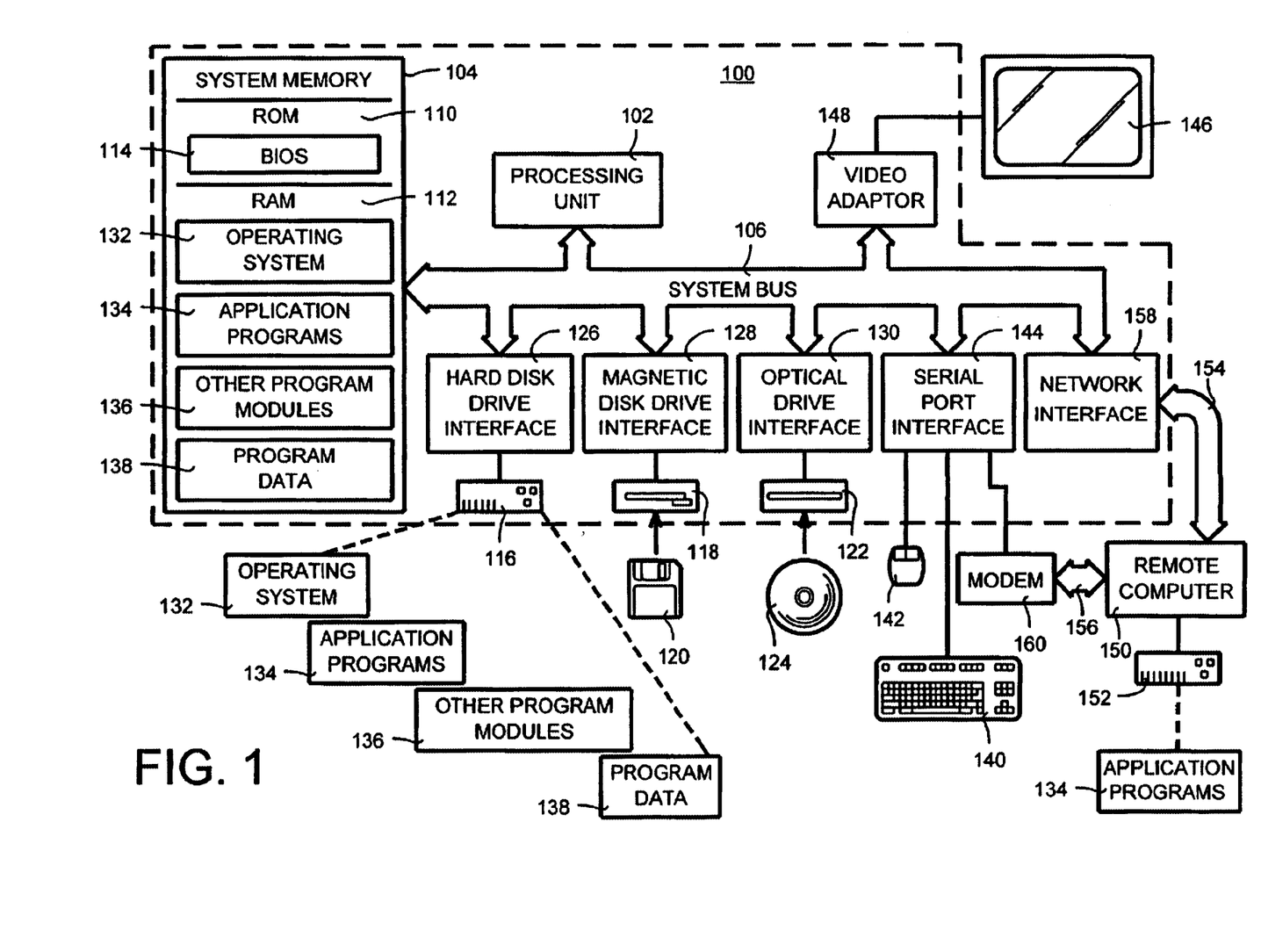
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

Components and Operation

Figure 2:
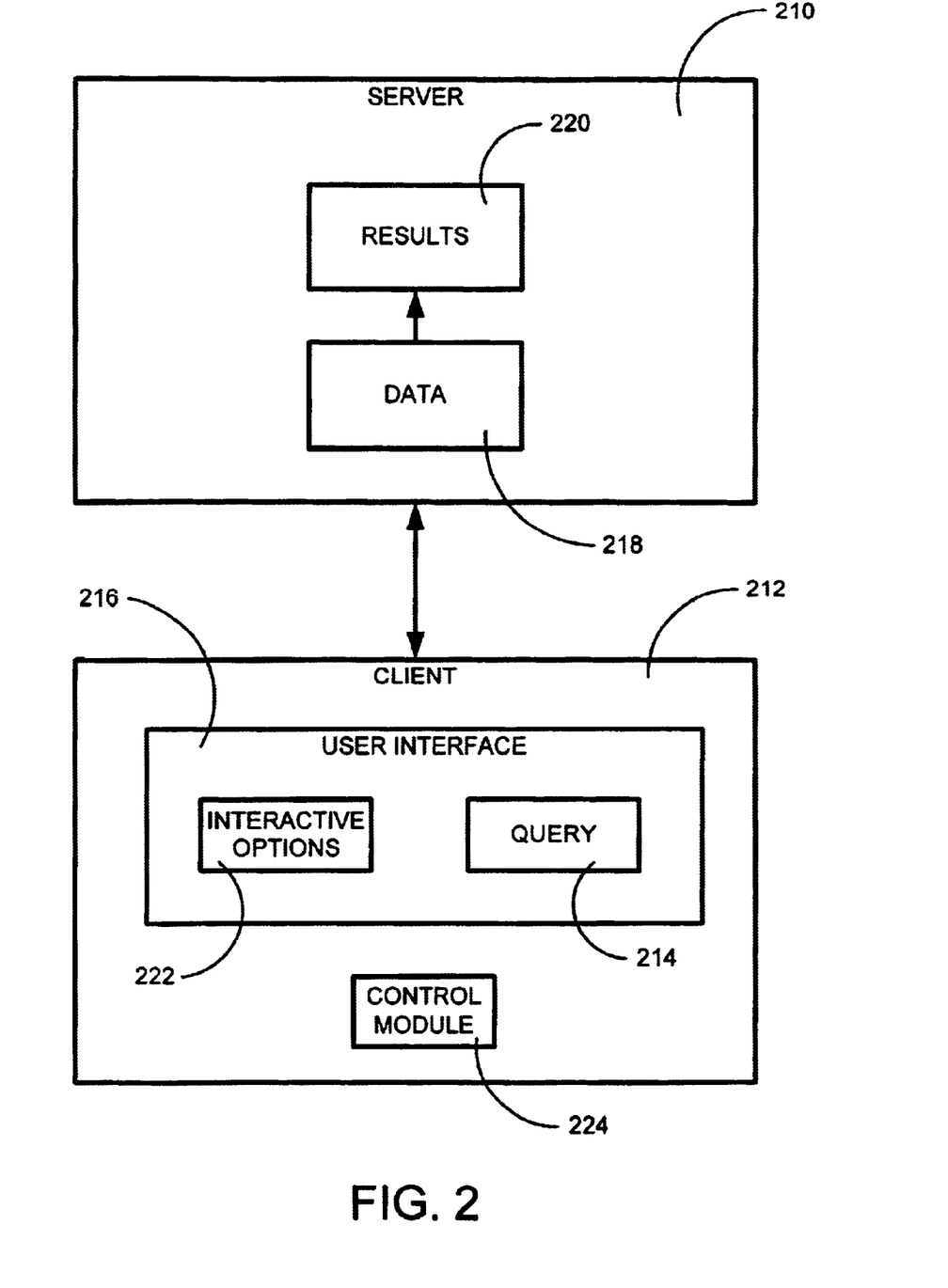
FIG. 2 is a block diagram illustrating an overview of the present invention.

FIG. 2 is a block diagram illustrating an overview of the present invention. The present invention is embodied in a system for adjusting data values in real time in response to remote user interaction with the data values. The system includes a host unit or server 210 coupled to at least one remote unit or client 212. In response to an initial client query 214 by a user through a user interface (UI) 216, such as a graphical user interface (GUI), data 218 stored on the server 210 is accessed, preferably as sorted data, to produce results 220 comprised of data values. The results 220 are transmitted to the client 212 and displayed on the user interface 216. The user at the client 212 is provided with interactive options 222 related to the data values, which allows the user to interact with the data values and make adjustments to the data values with user input directed to the interactive options 222. A control module 224, which can be sent from the to server to the client or created on the fly on the client 212, is preferably located on the client 212 during user interaction with the data values. The control module 224 controls the transmitted results and processes the user input for providing dynamic adjustment of the data values and real time user interactivity.

Figure 3:
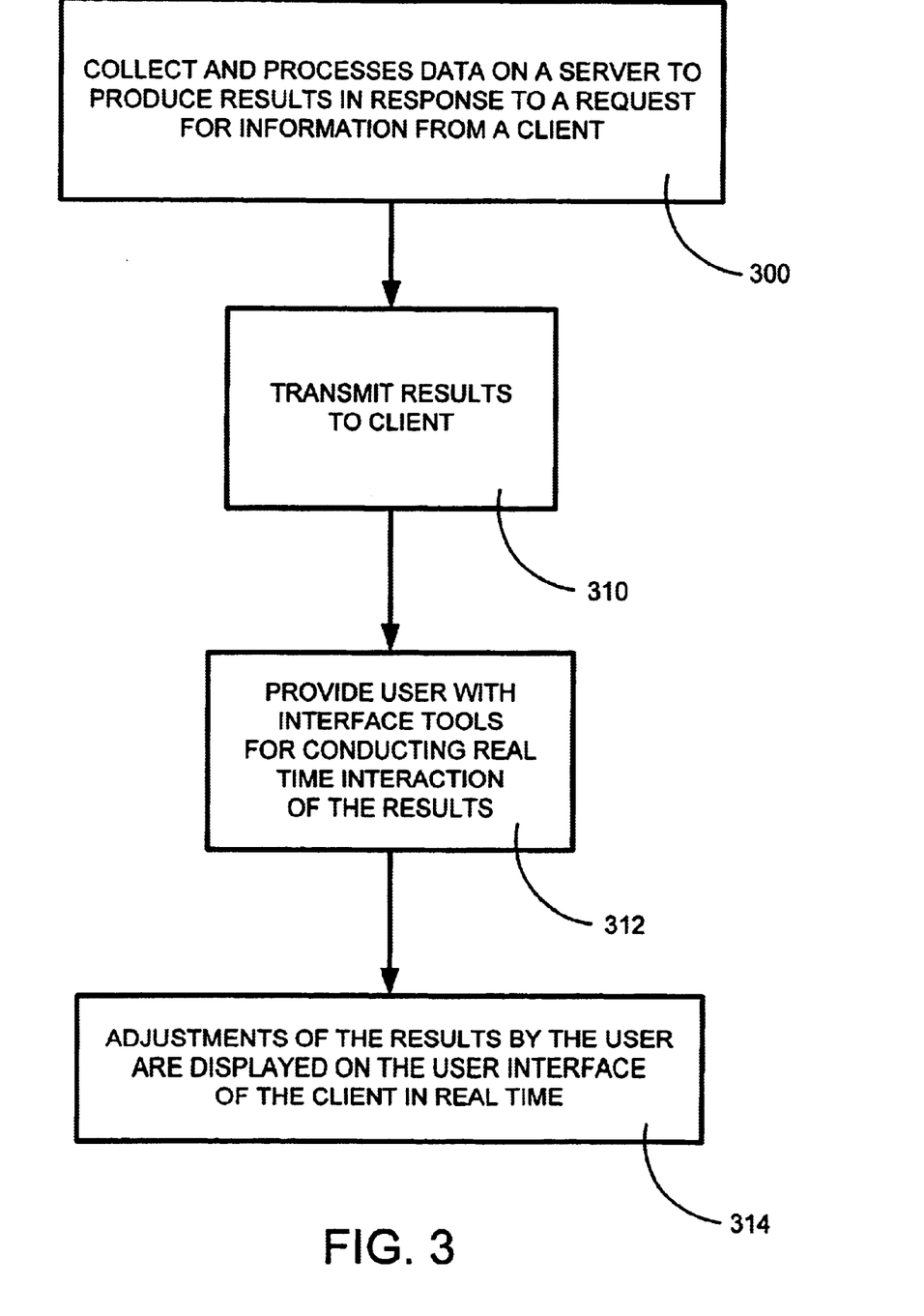
FIG. 3 is a flow diagram illustrating the general operational flow of the present invention.

FIG. 3 is a flow diagram illustrating the general operational flow of the present invention. Specifically, a host computer or server collects and processes data to produce results in response to a request for information from a remote computer or client (step 300). The results of the request are transmitted, preferably in an encoded format that is hidden from and transparent to the user, to the client from the server (step 310). The user is provided real time interactivity of the results with user input through interactive user interface options (step 312), such as graphical user interface tools. Adjustments of the results by the user are displayed on the user interface of the client in real time (step 314). The user input is preferably processed at the client to allow the real time interactivity in the form of adjustment, filtering and viewing of the results. FIGS. 2 and 3 refer to one server and one client for illustrative purposes only. It should be noted that the server referred to in FIGS. 2 and 3 can be one or more servers coupled to numerous respective clients and can communicate simultaneously with the clients in the manner described in FIGS. 2 and 3.

Figure 4:
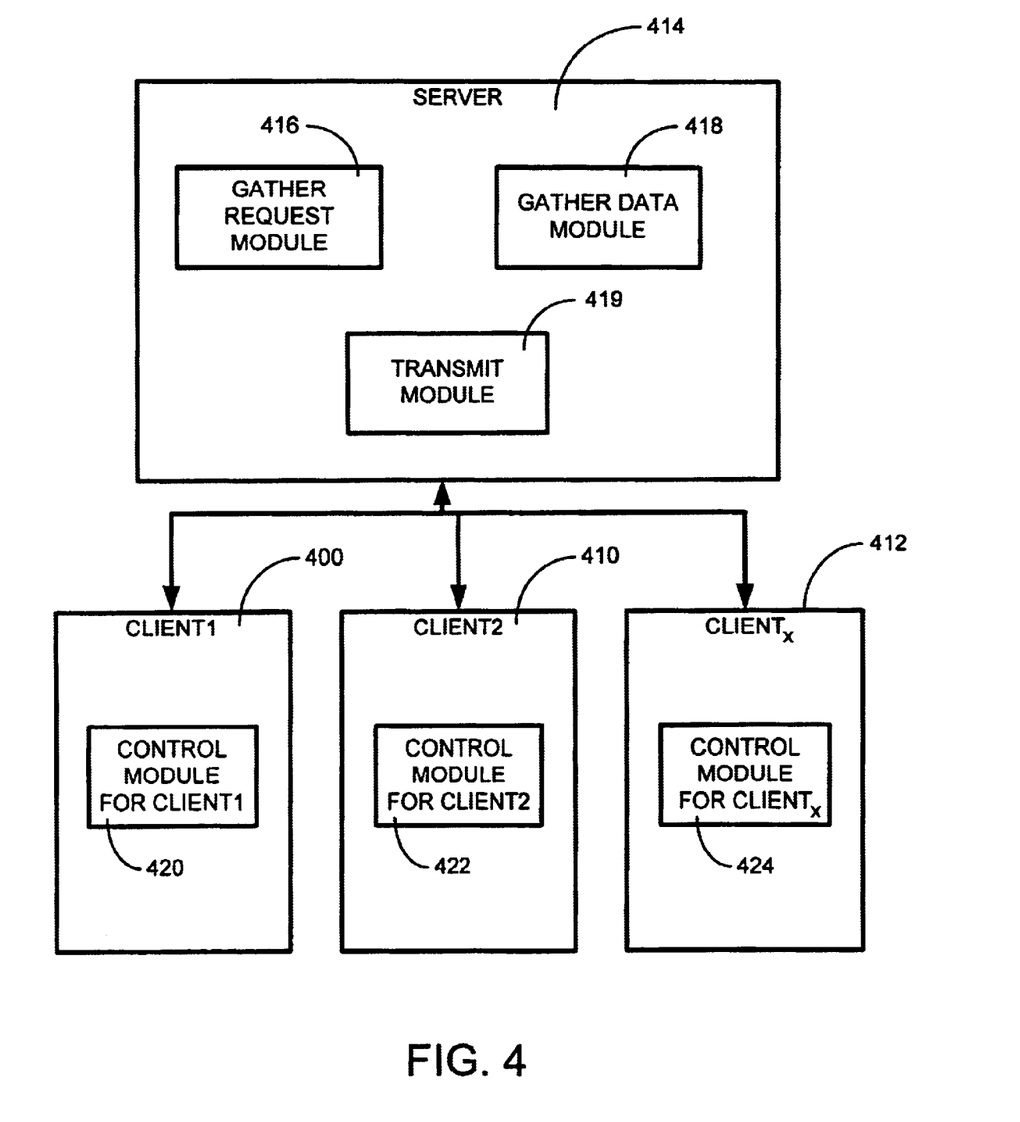
FIG. 4 is a block diagram illustrating a processing method in accordance with the present invention.

FIG. 4 is a block diagram illustrating a processing method in accordance with the present invention. In one embodiment, the present invention utilizes client-side processing. Client-side processing involves performing data adjustment in response to user input on the client instead of on the server. Client-side processing provides a remote user with real time interactivity and dynamic data adjustment, unlike server-side processing, which forces the remote user to access the server every time the remote user adjusts the data.

For example, as shown in FIG. 4, $client_1$ 400 makes $request_1$ ($R_1$), $client_2$ 410 makes $request_2$ ($R_2$) and $client_x$ 412 makes $request_x$ ($R_x$). A server 414 utilizes a gather request module 416 that gathers and sorts respective raw data results for each respective request. A gather data module 418 gathers, for example, respective encoded data, such as pre-compressed data packets that are associated with their respective raw data results. A transmit module 419 transmits the pre-compressed data packets, a control module ($CM_1$, $CM_2$, $CM_3$) for each pre-compressed data packet and a decompressor to respective clients ($Client_1$, $Client_2$, $Client_3$) in a format that is preferably transparent to respective users of the clients 400, 410, 412.

The transmitted control modules 420, 422, 424 reside on each client and decode and decompress the pre-compressed data to reproduce raw data results for each client. Each control module 420, 422, 424 also displays the respective raw data results for each respective client 400, 410, 412. In addition, each control module 420, 422, 424 provides each user with interactive options for adjusting the raw data results. For example, a graphical user interface control, such as graphical gauges, can be provided. The gauges can be a slider with, for example, dual upper and lower bounds or can be a single slider with a range bounded by zero and a fixed value. Since each control module resides on the client, they are able to process and display adjustments made by each user in real time, thereby providing a dynamic interactive environment.

The gather request module 416 and the gather data module 418 can utilize structured query language (SQL) techniques to process the request and gather the data. The control module can be any suitable module for controlling operations, such as an ActiveX control, Java applet, Perl applet, etc. Also, the control module can utilize any suitable data structure for organizing and adjusting the data in real time. For example, an array, stack and queue, linked list, decision tree, etc. can be used. In addition, the interactive options can be user friendly user interface devices, such as progressive boundary gauges, or progressive alphanumeric entry boxes for adjusting the raw data results.

Working Example

Figure 5:
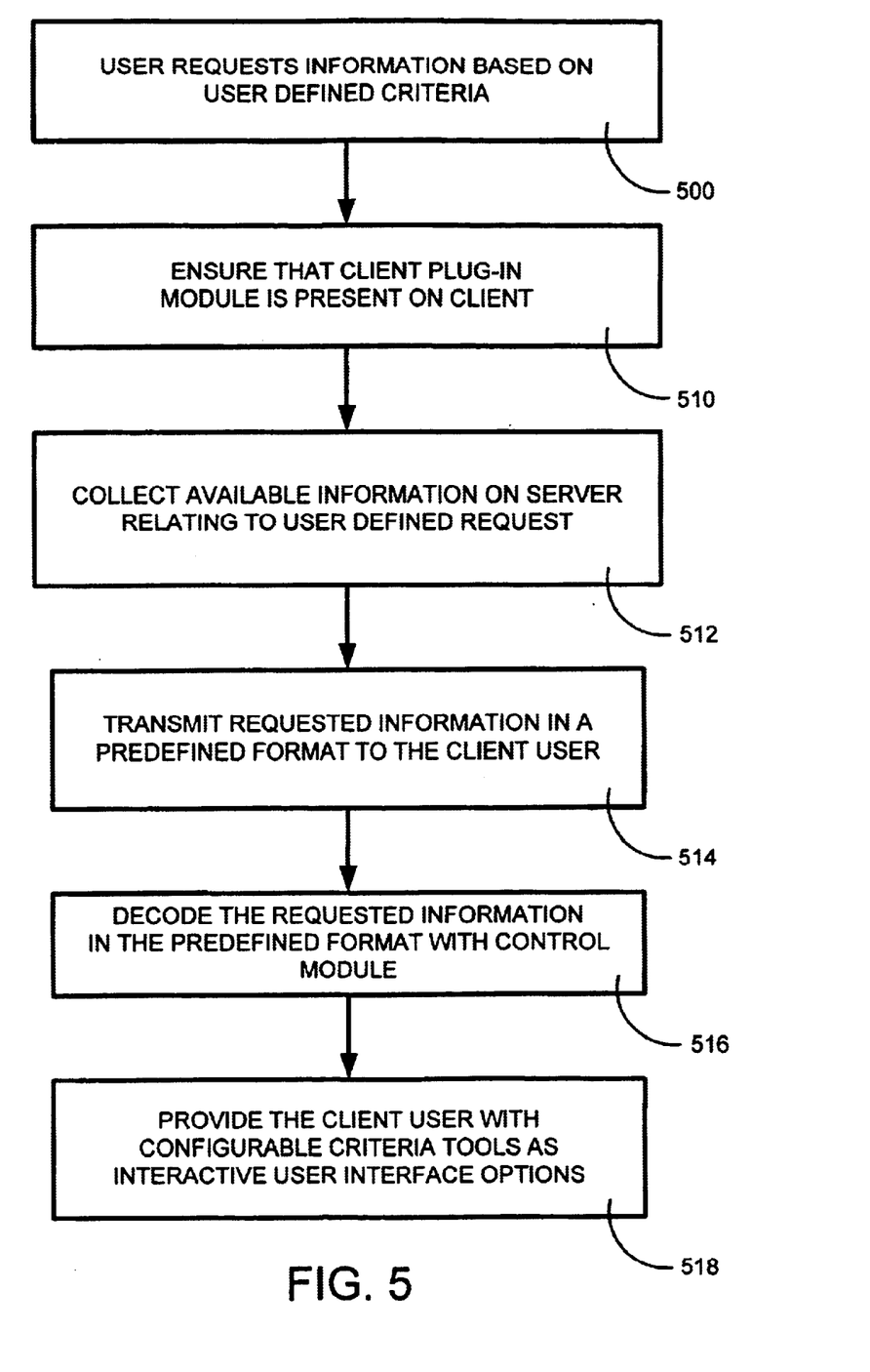
FIG. 5 is a flow diagram illustrating a working example of the system and method of the present invention.
Figure 6:
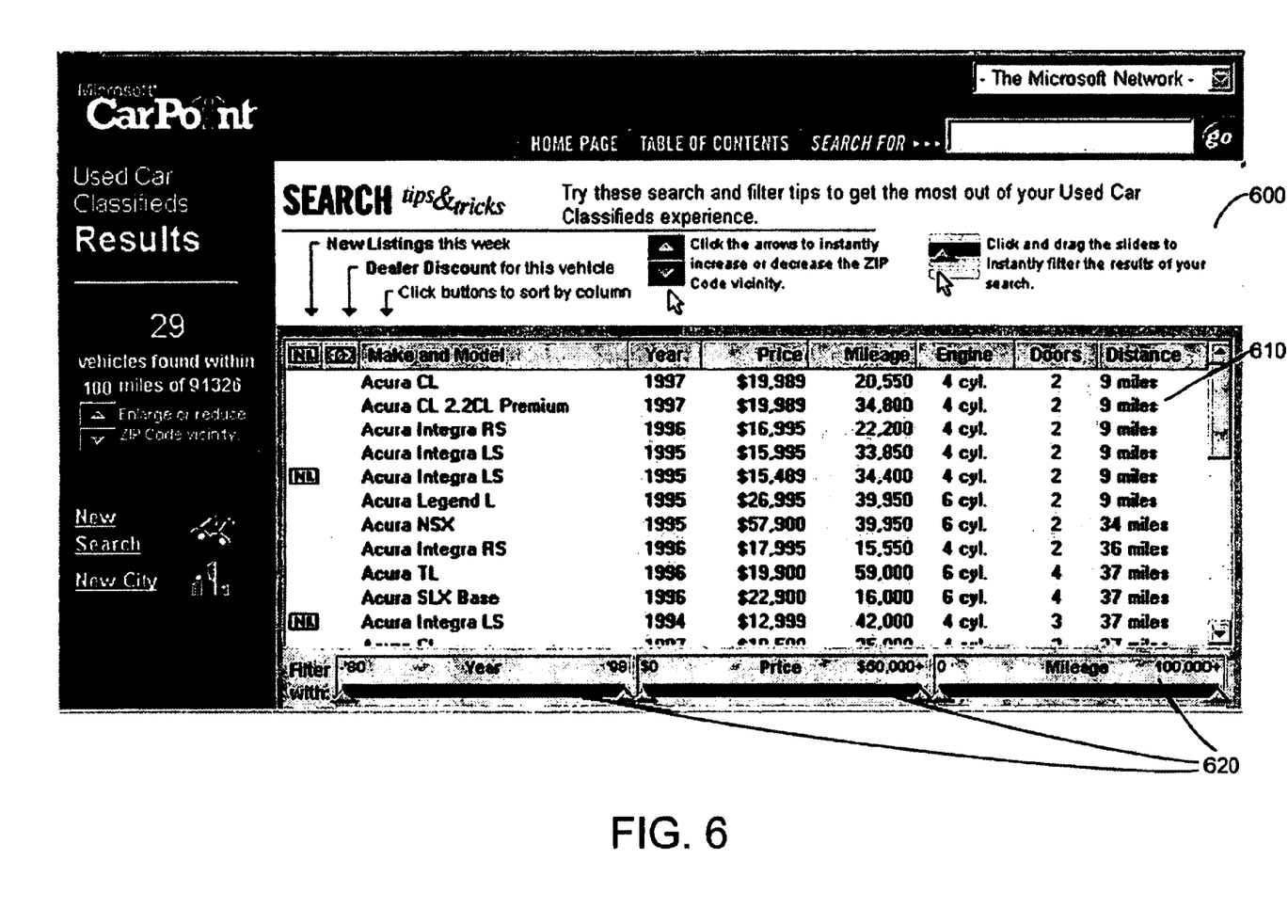
FIGS. 6 and 7 are sample user interfaces of the working example of FIG. 5 of the system and method of the present invention.
Figure 7:
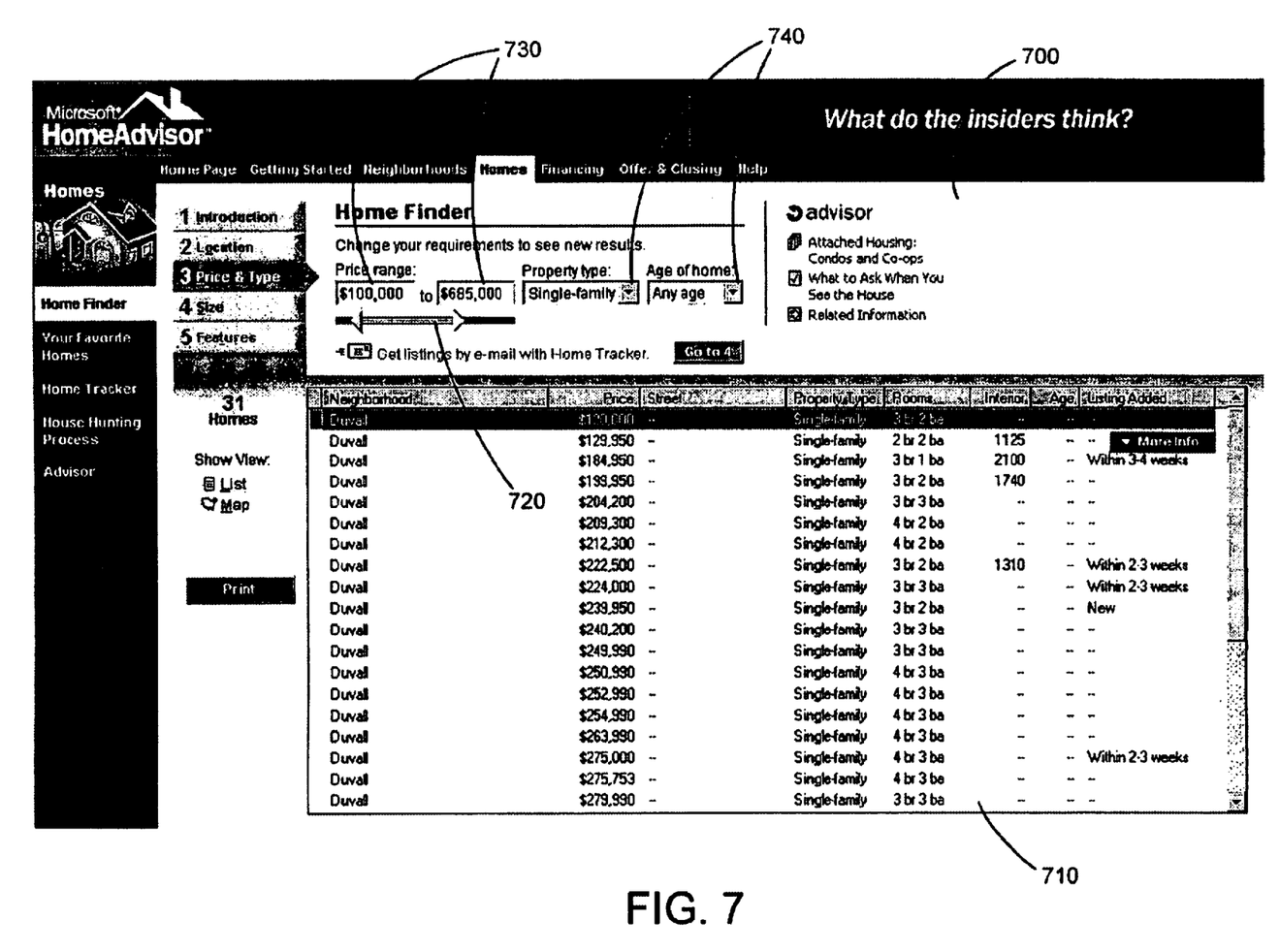

FIG. 5 is a flow diagram illustrating a working example of the system and method of the present invention. FIGS. 6 and 7 are sample user interfaces of the working example of FIG. 5 of the system and method of the present invention. As discussed above, any suitable control component and client-side processing technique can be used. FIG. 5 is for illustrative purpose only and shows a component object model (COM) control, such as an ActiveX control of a working example. The ActiveX control can be written in C++, Java, Visual Basic, or any suitable programming language. The control component allows user manipulation of the results with graphical user interface development tools.

Specifically, as shown in FIG. 5, first, the remote user requests information based on user defined criteria (box 500). For example, the user can request classified pricing information for used cars for sale based on make and model or for real estate for sale based on location, property type, etc. Next, the system ensures that the client has a processing plug-in control module, such as an ActiveX portability container, coupled to the client (box 510). If the client does not have the plug-in module, the plug-in control module is transmitted from the server and installed on the client.

Next, the server collects the requested information relating to the user's defined request that is stored on the server, such as used car information sorted by price, year, miles, etc. or real estate information sorted by location, price, type of home, etc. to produce results in response to the defined request from the client (box 512). The server can encode and compress the data associated with the results on the fly or have the associated data available as stored accessible raw results with corresponding pre-compressed data or pre-encoded data representing the results. The results are transmitted to the client preferably as encoded pre-compressed data and in a format that is transparent to the client user (box 514). The encoded data representing the results is decoded by the plug-in control module at the client to reproduce the raw results (box 516), which are displayed on the user interface 600, 700 of the client in a user readable format 610, 710 as shown in FIGS. 6 and 7, respectively. The results can be displayed as a query grid having at least one field and associated criteria.

Last, the client user is provided with real time interactivity of the results through interactive user interface options, such as graphical user interface tools (box 518). These interface options can include configurable slider filters, input boxes that can accept alphanumerical input or the like, drop-down menus or any suitable interface, such as graphical gauges that allow a user to move graphics within a reference datum for adjusting the criteria for associated fields in real time (box 518). For example, as shown in FIGS. 6 and 7, the user interface 600, 700 includes slider controls 620, 720 such as dual or single slider controls. The client user can click on a graphical lever and drag the lever of the slider filter control in either direction to narrow certain criteria of the results for each sorted field or category. For example, price, mileage, and year criteria for car sales, as shown in FIG. 6 or price range, property type, and age of home criteria for home sales for FIG. 7. The dual slider controls have multiple boundaries for constraining the results within a defined range, as shown in FIGS. 6 and 7.

Also, as shown in FIG. 7, the interface options can include configurable alphanumerical input boxes 730 and drop-down menus 740. The configurable alphanumerical input boxes 730 can be digitally coupled to the slider filters 720 so that both the slider filters 720 and the input boxes 730 dynamically change as the user configures the other interface. As a result, the user can interact with either interface option. In addition, the drop-down menus 740 and radio buttons (not shown) preferably have predefined criteria as the interface options. Since the plug-in control module resides on the client, interactivity by the client, for example with the use of the sliders, input boxes, drop-down menus, radio buttons or the like, is in real time. Therefore, as the user adjusts each of the sorted fields (car or home price, car mileage, car year, type of home, age of home, etc.) with the interface options, the data is filtered and displayed by the client dynamically.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A display device having rendered thereon dynamically changing results of a database query, comprising:

a query grid having at least one field and associated data, the query grid being stored on a server as raw data, wherein the query grid is transmitted from the server to a remote client through a communications interface in response to a communication from the client to the server; and adjustable interface options displayed on the client display device including a single slider control that is slidably moveable along a reference datum and dual slider controls disposed on a same slider track and having a first slider filter for adjusting a lower boundary criteria and a second slider filter for adjusting an upper boundary criteria of the at least one associated field in real time using the remote client to process the adjustment;

wherein the first and the second slider filters are dynamically coupled to an input box so that both the slider filters and the input box dynamically change as a user configures either the sliders filters or the input box to allow the user a choice of interactivity between the interface options.

2. The display device of claim 1, wherein the interface options are slider filters, input boxes, dropdown menus and radio buttons.

3. A method for dynamically adjusting associated data values on a client computer, the method comprising:

transmitting a plurality of data packets comprising associated data values from a host computer to a remote client computer in response to an initial query by the client computer, the associated data values being a subset of available data on the host computer relating to the initial query;

automatically displaying a control module on a display monitor of the client computer;

using dual slider controls displayed on the client display monitor to dynamically adjust the associated data values using the remote client to process the adjustment in response to user interaction with the automatically displayed control module, wherein the dual slider controls have a first slider disposed on a slider track for adjusting a lower boundary and a second slider disposed on the same slider track for adjusting an upper boundary of the associated data values within a range;

dynamically coupling the dual slider controls to an input box such that the dual slider controls dynamically change as a user adjust the associated data values using the input box; and dynamically displaying the adjusted data values on the client display monitor.

4. The method of claim 3 wherein the control module comprises a graphical user interface for manipulating and interacting with the data values in real time.

5. The method of claim 3 wherein the data values are hidden from the user until the user interacts with the control module.

6. The method of claim 3 wherein the plurality of data packets transmitted from the host computer to the remote client computer further comprises the control module.

7. The method of claim 3 wherein the control module is automatically created on the client computer.

8. The method of claim 3 wherein the control module is capable of dynamically adjusting the displayed data in response to user interaction with the control module after an electronic connection between the host computer and the remote client computer is terminated.

9. The method of claim 3 wherein the data is dynamically adjusted using the remote client computer to process the adjustment to provide real-time interactivity between the user and the dynamically displayed data.

10. The method of claim 3 wherein the dynamically displayed data is sorted by the control module in response to user interaction with the control module.

11. The method of claim 3 wherein the scope of the dynamically displayed data is limited by user interaction with the control module.

12. The method of claim 3 wherein the scope of the dynamically displayed data is expanded by user interaction with the control module.

13. The method of claim 3 wherein the control module has at least one graphical control for allowing the user to dynamically adjust the displayed data.

14. The method of claim 3 wherein the dynamically displayed data is pricing data.

15. A method for dynamically adjusting pricing data displayed on a client computer, comprising:

transmitting a set of pricing data from a server computer to the client computer in response to an initial query from the client computer, wherein the pricing data relates to the initial query and is a portion of available data on the server computer;

transmitting a control module comprising a graphical user interface from the server computer to the client computer;

automatically displaying the graphical user interface on the client computer;

adjusting the pricing data using dual slider filters contained on a single slider track in the graphical user interface and having a first slider filter for adjusting a lower boundary and a second slider filter for adjusting an upper boundary;

dynamically coupling the dual slider filters to an input box such that the dual slider filters dynamically change as a user adjusts the pricing data using the input box and the input box dynamically changes as the user adjusts the pricing data using the dual slider controls; and dynamically displaying the adjusted pricing data using the remote client to process the adjustment in response to user interaction with the automatically displayed graphical user interface.

16. The method of claim 15 further comprising transmitting a data decode module from the server computer to the client computer.

17. The method of claim 16 wherein the pricing data transmitted from the host computer is encoded.

18. The method of claim 17 further comprising automatically decoding the pricing data on the client computer with the data decode module using the client computer to decode the pricing data.

19. The method of claim 15 wherein the graphical user interface has at least one user interface control for dynamically adjusting the pricing data.

* * * * *